(12) United States Patent
Ishibashi et al.

(10) Patent No.: US 6,489,933 B1
(45) Date of Patent: Dec. 3, 2002

(54) DISPLAY CONTROLLER WITH MOTION PICTURE DISPLAY FUNCTION, COMPUTER SYSTEM, AND MOTION PICTURE DISPLAY CONTROL METHOD

(75) Inventors: Yasuhiro Ishibashi, Tokyo (JP); Hiroki Zenda, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/216,922

(22) Filed: Dec. 21, 1998

(30) Foreign Application Priority Data

Dec. 24, 1997 (JP) .............................. 9-355439

(51) Int. Cl.[7] .................................................. G09G 5/00
(52) U.S. Cl. ............................................................ 345/1.1
(58) Field of Search .............................. 345/1, 2, 3, 132, 345/115, 118, 119, 120, 1.1, 1.2, 1.3

(56) References Cited

U.S. PATENT DOCUMENTS

| | | | | |
|---|---|---|---|---|
| 5,488,385 A | * | 1/1996 | Singhal et al. ................. | 345/3 |
| 5,557,342 A | | 9/1996 | Eto et al. | |
| 5,563,665 A | | 10/1996 | Chang | |
| 5,598,525 A | * | 1/1997 | Nally et al. ................. | 395/520 |
| 5,841,418 A | * | 11/1998 | Bril et al. ................. | 345/1 |
| 6,028,586 A | * | 2/2000 | Swan et al. ................. | 345/132 |
| 6,049,316 A | * | 4/2000 | Nolan et al. ................. | 345/1 |
| 6,078,361 A | * | 6/2000 | Reddy ......................... | 348/558 |
| 6,118,413 A | * | 9/2000 | Bril et al. ................. | 345/3 |
| 6,215,459 B1 | * | 4/2001 | Reddy et al. ................. | 345/3 |

FOREIGN PATENT DOCUMENTS

| | | |
|---|---|---|
| JP | 7-75014 | 3/1995 |
| JP | 7-334134 | 12/1995 |

* cited by examiner

*Primary Examiner*—Richard Hjerpe
*Assistant Examiner*—Ronald Laneau
(74) *Attorney, Agent, or Firm*—Finnegan, Henderson, Farabow, Garrett & Dunner, L.L.P.

(57) ABSTRACT

A VGA controller has a pass through mode and VRAM mode as motion picture display modes, and one of these display modes can be selected by controlling a switch. In the pass through mode, video data input from a video port interface can be directly output to an NTSC/PAL encoder without the intervention of a VRAM. In this mode, original video data can be displayed on a TV with its original quality. On the other hand, in the VRAM mode, the refresh rate for screen display is matched with the vertical sync frequency of video data, and a high-quality image free from any "tearing" can be obtained.

18 Claims, 6 Drawing Sheets

| | RESOLUTION | REFRESH RATE |
|---|---|---|
| GRAPHICS DISPLAY | 640×480 | 60Hz 72Hz 75Hz |
| | 800×600 | 56Hz 60Hz 72Hz 75Hz |
| | 1024×768 | 60Hz 70Hz 72Hz 75Hz |
| | 1280×1024 | 60Hz 75Hz |
| VIDEO DISPLAY OR VIDEO GRAPHICS | 640×480 | VIDEO INPUT VALUE |
| | 800×600 | VIDEO INPUT VALUE |
| | 1024×768 | VIDEO INPUT VALUE |
| | 1280×1024 | VIDEO INPUT VALUE |

DISPLAY CONTROLLER WITH MOTION PICTURE DISPLAY FUNCTION, COMPUTER SYSTEM, AND MOTION PICTURE DISPLAY CONTROL METHOD

BACKGROUND OF THE INVENTION

This application is based on Japanese Patent Application No. 9-355439 filed Dec. 24, 1997, the content of which is incorporated herein by reference.

The present invention relates to a display controller and a computer system using the same and, more particularly, to a display controller having a motion picture display function, computer system, and motion picture display control method.

In recent years, along with the development of computers and multimedia techniques, various kinds of so-called multimedia compatible personal computers have been developed. A personal computer of this type has a function of reproducing motion pictures and audio data in addition to text and graphics data.

With the advent of such multimedia computers, a DVD has received a lot of attention as an alternative storage medium to a CD-ROM. A single DVD-ROM medium can record data of about 4.7 Gbytes about seven times the capacity of the existing CD-ROM on one side, and can record data of about 9.4 Gbytes in case of two-sided recording. Using such DVD-ROM media, titles such as movies including a large volume of video information can be reproduced with high quality on the personal computer.

Video information recorded on a DVD-ROM medium consists of two kinds of data, i.e., presentation data and navigation data. The presentation data is a set of video objects to be reproduced, and consists of video, subpicture, and audio data. The video data is compressed and coded by MPEG2. As the coding schemes of subpicture and audio data, runlength coding, DOLBY DIGITAL, and the like are supported. The subpicture data is bitmap data, and is used for displaying superimposed dialogues of a movie, selection items on a menu window, and the like. One video object can contain video data for one channel, audio data for a maximum of eight channels, and subpicture data for a maximum of 32 channels.

The navigation data is reproduction control data for controlling the reproduction sequence of the presentation data, and navigation commands can be embedded in this data. The navigation commands are used for changing the reproduction contents or order of video data. Using the navigation commands, a title creator can define various branch structures in his or her title, and can create an interactive title.

When a motion picture title stored in a DVD is reproduced on a personal computer, an encoded stream of motion picture data is loaded from a DVD drive into the main memory of the personal computer, and the loaded stream is transferred to an MPEG2 decoder. The MPEG2 decoder descrambles the encoded stream, which has been scrambled to prevent the title from being illicitly copied, and then decodes to expand the encoded stream. The decoded motion picture data is sent to a display controller (VGA controller) for controlling the display monitor of the personal computer. The motion picture data sent to the VGA controller is temporarily written in a video RAM like normal graphics data provided by an OS or an application program, and is then displayed on the screen of the display monitor or a TV.

However, the motion picture data stored in the DVD is created based on TV video signals of, e.g., the NTSC scheme as in a home TV, and the vertical sync frequency of the motion picture data decoded by the MPEG2 decoder is normally 60 Hz (60 fields/sec). By contrast, the VGA controller is designed to display at a dedicated refresh rate (60 Hz, 72 Hz, 75 Hz, or the like) for controlling a sequential scan display monitor. The refresh rate used is determined by the screen resolution or the like of the display monitor. Note that the refresh rate represents the number of fields to be refreshed per second, and the quality of the display screen can be improved as the refresh rate becomes higher. Normally, a refresh rate of at least 60 Hz or more is required (in a non-interlace mode) to avoid the human eyes from feeling flickering.

Hence, when the motion picture data is displayed via the VGA controller, the vertical sync frequency of the motion picture data written in the video RAM is often different from the refresh rate for screen display. In such case, so-called "tearing" occurs, i.e., a horizontal line seems to scroll from the top to bottom or vice versa on the display screen. The "tearing" is produced as follows.

For example, assume that the vertical sync frequency of the motion picture data is 60 Hz (60 fields/sec), and the refresh rate for screen display is set at 75 Hz. In this case, the field image of the motion picture on the video RAM is refreshed 60 times per sec by writing the motion picture data, while the number of fields to be read out from the video RAM to refresh the screen is 75 per sec. Hence, a field image in the middle of being rewritten on the video RAM is read out, and is displayed as the next field, thus causing the above-mentioned "tearing".

Also, since the motion picture data premised on a display on a home TV and computer graphics data have different color spaces, signal bands, scan schemes, and the like, the VGA controller must convert the color space of the motion picture data from YUV into RGB for computer graphics, and must perform other conversion processes such as conversion of the signal band (conversion of the dynamic range), conversion from the interlace mode to the non-interlace mode, and the like. Conventionally, independently of the display monitor or TV on which the motion picture data is to be displayed, the motion picture data is temporarily written in the video RAM. Hence, such conversion processes are performed not only when the motion picture data is displayed on the display monitor of the computer, but also when it is displayed on the TV. For this reason, when the motion picture data is displayed on the TV via the VGA controller, the displayed image is inferior to the original image as a result of various conversion processes.

BRIEF SUMMARY OF THE INVENTION

It is an object of the present invention to provide a display controller, computer system, and motion picture display control method, which can prevent the above-mentioned "tearing" and deterioration of image quality that may take place when motion picture data is displayed on a TV, and can display motion picture data such as a DVD title and the like with high quality.

In order to achieve the above object, according to the present invention, there is provided a display controller which can display an image on a display monitor of a computer having an image memory or a TV, comprising: a port for externally inputting motion picture data; and refresh rate control means for matching a refresh rate used for displaying the motion picture data input from the port on a screen of the display monitor or TV with a vertical sync frequency of the motion picture data input from the port.

According to this display controller, when motion picture data is input from the port, the refresh rate is automatically changed in correspondence with the vertical sync frequency of that motion picture data. As a result, the number of field images of a motion picture to be refreshed per second by writing motion picture data in the image memory can be matched with the number of fields to be read out from the image memory and displayed per second for refreshing the screen, thus preventing the above-mentioned "tearing". Hence, even when motion picture data is temporarily written in the image memory and is then displayed on the display monitor, the user can observe a high-quality image free from "tearing".

Since the refresh rate is changed in correspondence with the vertical sync frequency of the motion picture data, the horizontal/vertical sync signals of the motion picture data input from the port can be used as those for displaying on the display monitor or TV. Since the horizontal/vertical sync signals of the motion picture data input from the port are used as those for displaying on the display monitor or TV, mapping of motion picture data on the image memory can be perfectly synchronized with refreshing. More specifically, even when the refresh rate is concordant with the vertical sync frequency of the motion picture data, a horizontal line may appear at a specific position in the display screen if phase shifts are present. However, since mapping of motion picture data on the image memory can be perfectly synchronized with refreshing, such problem can also be solved.

Also, according to the present invention, a display controller which can display data written in an image memory on a display monitor of a computer or a TV, comprises a port for externally inputting motion picture data, and a transfer bus inserted between the port and a TV encoder for generating a TV video signal, and is characterized in that when the motion picture data input from the port is displayed on the TV, the motion picture data is directly transferred from the port to the TV encoder via the transfer bus.

In this display controller, the transfer bus is prepared as a route for directly inputting the motion picture data from the port to the TV encoder. When motion picture data is displayed on the TV, the motion picture data from the port is directly sent to the TV encoder without the intervention of an image memory, and is displayed on the TV. With this arrangement, the need for conversion processes such as conversion of the color space of the motion picture data from YUV to RGB for computer graphics, conversion of the signal band (conversion of the dynamic range), conversion from the interlace mode to non-interlace mode, and the like can be obviated, and deterioration of image quality due to such conversion processes can be prevented.

Even when such pass through mode without the intervention of an image memory is used, since the horizontal/vertical sync signals of the motion picture data are directly sent from the port to the TV encoder together with the motion picture data, the horizontal/vertical sync signals of the motion picture data input from the port can be directly used as those for displaying on the display monitor or TV.

A switch means for switching data to be input to the TV encoder between motion picture data transferred via the transfer bus and display data read out from the image memory is preferably arranged at the input stage of the TV encoder. When the TV encoder input is switched to the transfer bus side by the switch means, the motion picture data can be directly displayed on the TV. On the other hand, when the TV encoder input is switched to the image memory side, graphics data mapped on the image memory by an application program can be displayed on the TV. Furthermore, the graphics data on the image memory and the motion picture data can be synthesized and displayed by switching the input by the switch means, and even when the transfer bus is used, overlay display for displaying motion picture data on a window which is opened at a specific position on the graphics field can be implemented.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiment of the present invention will be described hereinafter with reference to the accompanying drawings.

Figure 1:
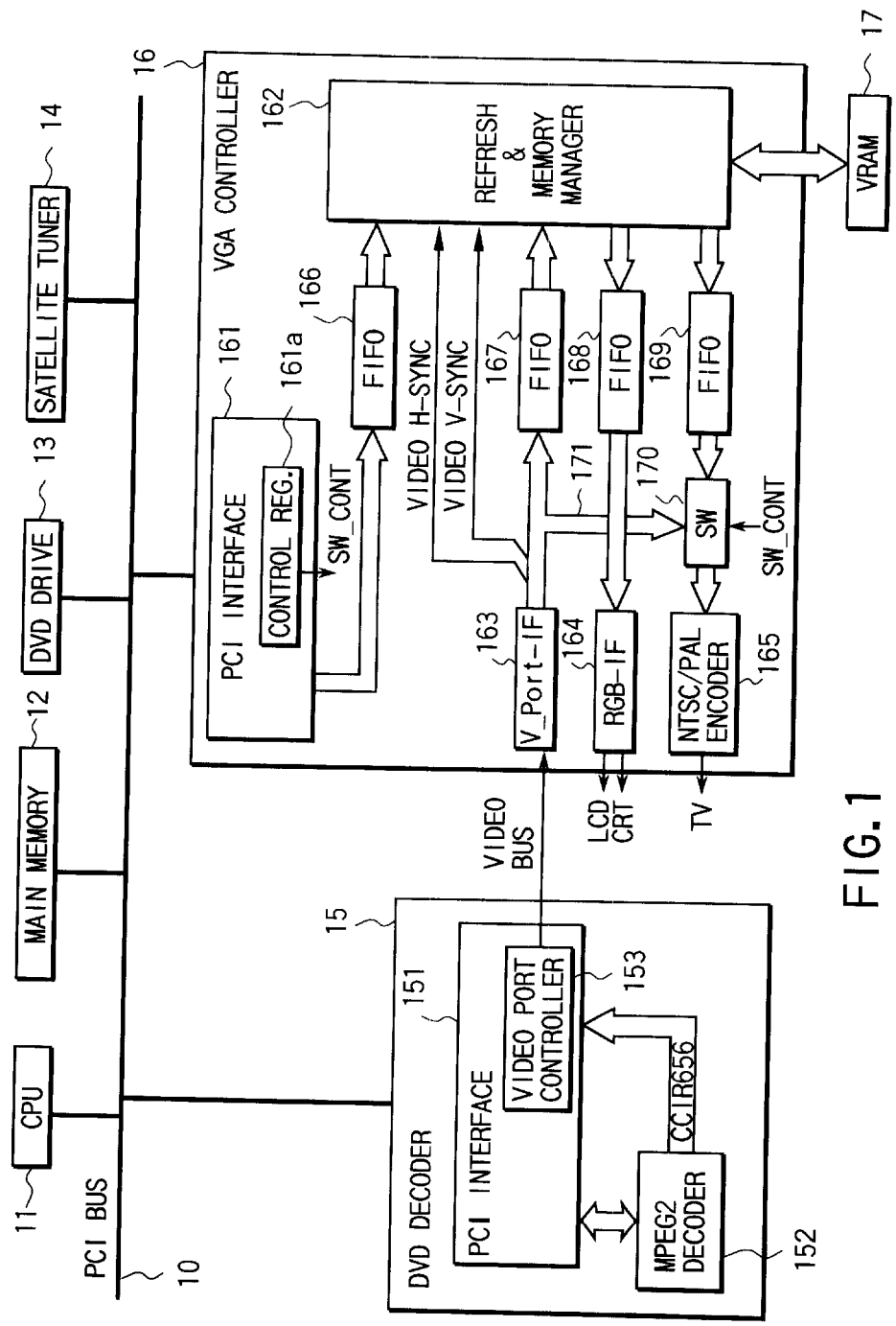
FIG. 1 is a block diagram showing the arrangement of a computer system according to an embodiment of the present invention.

FIG. 1 shows the system arrangement of a computer system according to an embodiment of the present invention. The personal computer is a notebook type personal computer in which a flat panel display such as an LCD is attached to a computer main body to be free to open/close, and comprises a PCI bus 10, CPU 11, main memory 12, DVD driver 13, satellite tuner 14, DVD decoder 15, VGA controller 16, and video RAM (VRAM) 17, as shown in FIG. 1.

The CPU 11 controls the operations of the entire system, and executes an operation system, an application program to be executed, and the like stored in the main memory 12. Motion picture data on a DVD medium driven by the DVD drive 13 is reproduced by executing various driver programs for hardware control and a DVD application program by the CPU 11.

The DVD drive 13 reads out a datastream stored in a DVD medium having a storage capacity of about 10 GB on both surfaces of the disk at a transfer rate of 10.08 Mbps at maximum. The DVD medium can record a DVD title such as a movie or the like. The movie information can include main picture data (video), subpicture data (sub field) up to 16 channels, and audio data (audio) up to 32 channels. In such case, these video, subpicture, and audio data are recorded after they undergo digital compression coding according to MPEG2. In MPEG2, data encoded by MPEG2 can include data encoded by other coding schemes, and such encoded data are processed as a single MPEG2 program stream.

MPEG2 is used for video coding, and runlength coding and DOLBY DIGITAL are respectively used for subpicture and audio coding. In such case as well, encoded video, subpicture, and audio data are processed as a single MPEG2 program stream.

Coding based on MPEG2 is variable rate coding, and the information volume to be recorded/reproduced per unit time can be varied. Hence, as the scene has faster motion, the transfer rate of an MPEG stream that forms the corresponding frames is increased, thus allowing high-quality reproduction of motion pictures.

The satellite tuner 14 receives video data transmitted from a digital satellite broadcast station, and transfers it to the main memory 12. When the video data coming from the digital satellite broadcast is an MPEG2 stream, it is decoded by the MPEG2 decoder in the DVD decoder 15 in the same manner as an MPEG2 stream of the DVD video data read out from the DVD drive 13.

The DVD decoder 15 receives an MPEG2 program stream read out from the DVD drive 13 or received by the satellite tuner 14 via the PCI bus 10, and decodes the received stream to descramble and expand it. The DVD decoder 15 comprises a PCI interface 151 and MPEG2 decoder 152, as shown in FIG. 1.

Figure 2:
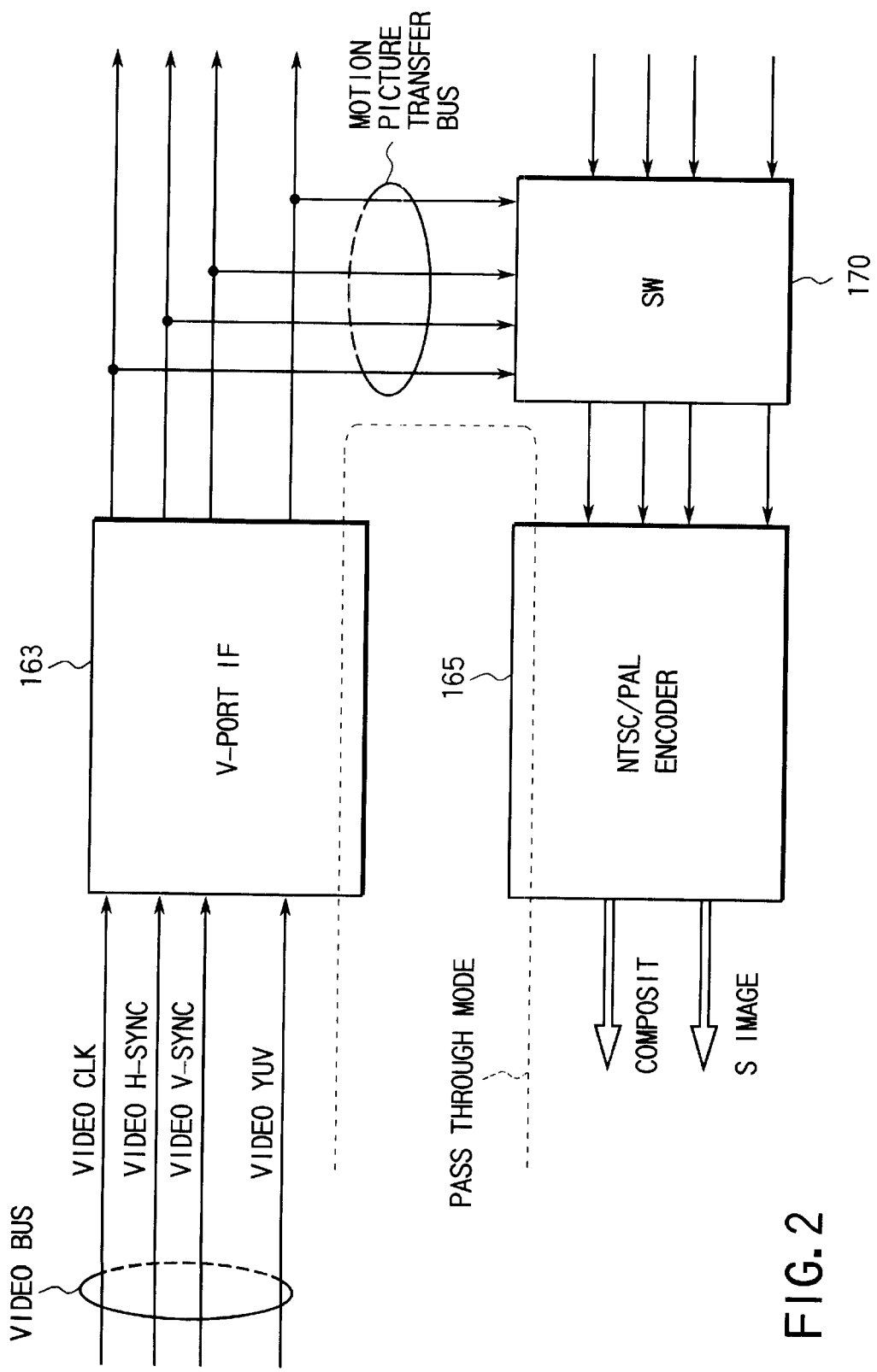
FIG. 2 is a block diagram showing an example of the arrangement of a motion picture transfer bus that connects a video port interface (V_Port-IF) and an NTSC/PAL encoder in the computer system of the embodiment shown in FIG. 1.

The PCI interface 151 interfaces between the PCI bus 10 and MPEG2 decoder 152, and sends an MPEG2 stream received via the PCI bus 10 to the MPEG2 decoder 152. The PCI interface 151 includes a video port controller 153. The video port controller 153 transfers video data in the digital YUV format decoded by the MPEG2 decoder 152 to the video input port of the VGA controller 16 via a video bus comprising, e.g., a ZV port. In the video bus, a clock CLK signal line, horizontal sync signal H-Sync line, vertical sync S signal V-Sync line, and 8/16-bit wide digital YUV line are defined, as shown in FIG. 2.

The MPEG2 decoder 152 decodes an MPEG2 stream received from the PCI interface 151, and includes a descrambling processor, MPEG2 stream multiplexer/demultiplexer, decode circuits corresponding to video, audio, and subpicture data, and the like. Digital YUV data as the decoding result of video and subpicture data by the MPEG2 decoder 152 is sent to the video port controller 153 of the PCI interface 151 as a digital signal in the CCIR656 format.

The VGA controller 16 controls an LCD display arranged as a dedicated display monitor of the computer main body, and an external CRT display, and supports VGA/SVGA graphics displays, and a motion picture display. Motion picture data is input to the video port not via the PCI bus 10 but via the above-mentioned video bus, and is displayed on a display monitor such as the LCD display, external CRT display, or the like, or an external TV.

The VGA controller 16 comprises a PCI interface 161, refresh & memory manager 162, video port interface (V_Port-IF) 163, RGB interface (RGB-IF) 164, NTSC/PAL encoder 165, FIFO buffers 166, 167, 168, and 169, and a switch 170.

The PCI interface 161 receives graphics data and its mapping instruction from the OS or application program via the PCI bus 10, and passes it to the refresh & memory manager 162 via the FIFO buffer 166. Also, the PCI interface 161 includes various control registers for controlling the operation of the VGA controller 16, and display mode switching and the like are done in accordance with the control parameter values set in these registers.

The refresh & memory manager 162 performs, e.g., screen refresh control for writing display data (graphics data and video data) in the VRAM 17 and reading out the display data from the VRAM 17 to display it on the screen. There are two input routes of display data to be written in the VRAM 17, i.e., the route for receiving graphics data input from the PCI interface 161 via the FIFO buffer 166, and the route for receiving video data input from the video port interface (V_Port-IF) 163 via the FIFO buffer 167. Also, there are two output routes of display data read out from the VRAM 17, i.e., the route for transferring video data or graphics data in the VRAM 17 to the RGB interface (RGB-IF) 164 via the FIFO buffer 168, and the route for transferring video data or graphics data in the VRAM 17 to the NTSC/PAL encoder 165 via the FIFO buffer 169. The video data or graphics data transferred to the NTSC/PAL encoder 165 is converted into a TV signal in the NTSC or PAL format, and is displayed on the TV.

The data transfer timing from the VRAM 17 to the RGB interface (RGB-IF) 164 or the NTSC/PAL encoder 165 is determined by the refresh rate. In this case, the refresh rate is determined by the screen resolution of the display monitor or user's setups in case of a graphics display. However, in case of a motion picture display, i.e., when video data input from the video port interface (V_Port-IF) 163 is to be displayed, the refresh rate is automatically changed to match the vertical sync frequency of that video data on the basis of the horizontal/vertical sync signals (video H_Sync and video V_Sync) input from the video port interface (V_Port-IF) 163 together with the video data.

For example, when the vertical sync frequency of the video data input from the video port interface (V_Port-IF) 163 is 60 Hz, the refresh & memory manager 162 operates at a refresh rate of 60 Hz to display the display data on the VRAM 17 on the screen of the TV or display monitor.

The video port interface (V_Port-IF) 163 receives video data transferred from the DVD decoder 15 via the video bus, and passes it to the refresh & memory manager 162 via the FIFO buffer 167. This embodiment provides a route for directly inputting video data from the video port interface (V_Port-IF) 163 to the NTSC/PAL encoder 165 (motion picture transfer bus) 171 in addition to the transfer route from the video port interface (V_Port-IF) 163 to the refresh & memory manager 162, as shown in FIG. 1.

Furthermore, the switch (SW) 170 for switching the input to the NTSC/PAL encoder 165 between those from the video port interface (V_Port-IF) 163 and the refresh & memory manager 162 is inserted at the input stage of the NTSC/PAL encoder 165, as shown in FIG. 1. Operation of the switch (SW) 170 can be controlled by software by writing switch control information in a control register 161a included in the PCI interface 161.

More specifically, the VGA controller 16 of this embodiment has, as a motion picture display mode for displaying video data input from the video port interface (V_Port-IF) 163, a pass through mode using the motion picture transfer bus, and a VRAM mode for temporarily writing video data in the VRAM 17 and then displaying that video data. These display modes can be selected by rewriting the switch control information.

For example, when the switch (SW) 170 is switched to the video port interface (V_Port-IF) 163 side by the switch control information, video data can be directly displayed on the TV without the intervention of the VRAM 17. In this case, since none of conversion processes such as conversion of the color space of video data from YUV to RGB for computer graphics, conversion of the signal band (conversion of the dynamic range), conversion from the interlace mode to the non-interlace mode, and the like are performed, original video data can be displayed on the TV with its original quality. In this pass through mode, the switch (SW) 170 can also be used as a multiplexer for synthesizing graphics data read out from the VRAM 17 by the refresh & memory manager 162, and video data input via the motion picture transfer bus, thus realizing an overlay display that displays video data on a window opened at a specific position on the graphics field. In this case, the switch (SW) 170 is switched on the basis of the coordinate information of the window for displaying the video data.

On the other hand, when the switch (SW) 170 is switched to the refresh & memory manager 162 side, the VRAM mode is selected. This VRAM mode is mainly used when video data is temporarily written in the VRAM 17, and is then displayed on the display monitor via the RGB interface (RGB-IF) 164 or when graphics data on the VRAM 17 is displayed on the TV. When video data is to be displayed in the VRAM mode, since the refresh rate for screen display is matched with the vertical sync frequency of the video data, as described above, the user can observe a high-quality image free from any "tearing".

FIG. 2 shows an example of the arrangement of the motion picture transfer bus that connects the video port interface (V_Port-IF) 163 and NTSC/PAL encoder 165.

As shown in FIG. 2, in the motion picture transfer bus, a clock CLK signal line, horizontal sync signal H-Sync line, and vertical sync signal V-Sync line are defined in addition to an 8–16-bit wide digital YUV line for transferring video data. The clock CLK signal, horizontal sync signal H-Sync, and vertical sync signal V-Sync of video data input to the video port interface (V_Port-IF) 163 are input to the NTSC/PAL encoder 165 via the motion picture transfer bus. With this arrangement, in the pass through mode, the horizontal/vertical sync signals of video data input from the video port interface (V_Port-IF) 163 are directly used as those for display on the display monitor or TV.

An example of the arrangement of the refresh & memory manager 162 and the operation of the refresh & memory manger 162 in the VRAM mode will be explained below with reference to FIG. 3.

Figure 3:
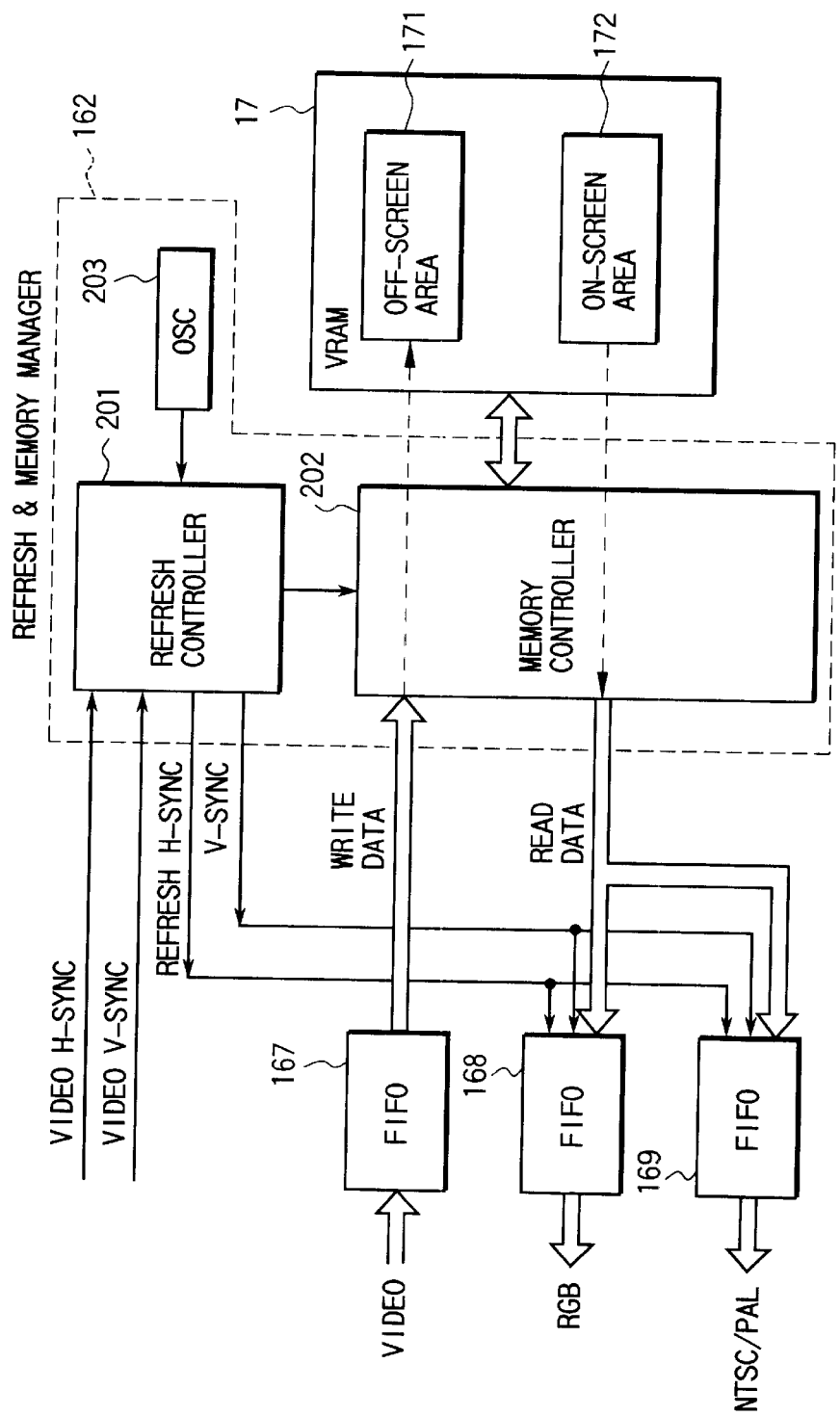
FIG. 3 is a block diagram showing an example of the arrangement of a refresh & memory manager of a VGA controller arranged in the computer of the embodiment shown in FIG. 1.

As shown in FIG. 3, the refresh & memory manager 162 comprises a refresh controller 201, memory controller 202, and oscillator (OSC) 203.

The refresh controller 201 controls the display timing for screen display, and generates a refresh rate control signal and the corresponding horizontal/vertical sync signals (refresh H-Sync and V-Sync) for display on the display monitor or TV. These refresh H-Sync and V-Sync signals are input to the RGB interface (RGB-IF) 164 and NTSC/PAL encoder 165 together with the display data read out from the VRAM 17 via the FIFO buffers 168 and 169, respectively.

Upon reception of the horizontal/vertical sync signals (video H-Sync and video V-Sync) of video data from the video port interface (V_Port-IF) 163, the refresh controller 201 automatically matches the current refresh rate with the vertical sync frequency of the video data. Also, the refresh controller 201 directly sends the horizontal/vertical sync signals (video H-Sync and video V-Sync) of the video data to the FIFO buffers 168 and 169 as those for display on the display monitor or TV. For this purpose, the refresh controller 201 has a selector for selecting one of a 60-Hz refresh signal generated by frequency-dividing a 27-MHz frequency signal output from the oscillator 203, and 60 Hz as the vertical sync frequency of the video data.

The memory controller 202 makes a read and write of display data (graphics data, video data) with respect to the VRAM 17 under the control of the refresh controller 201, and the transfer timing of the display data in the VRAM 17 to the FIFO buffers 168 and 169 is determined according to the refresh rate determined by the refresh controller 201. Display data is written in an off-screen area 171 on the VRAM 17, and is read out from an on-screen area 172 for the purpose of screen refreshing.

Video data is read out from the on-screen area 172 during a display period determined by the video H-Sync and video V-sync signals, and video data is written in the off-screen area 171 during the blanking period determined by the video H-Sync and video V-sync signals. The off-screen area 171 and on-screen area 172 are switched for each display line, and video data mapped during the immediately preceding horizontal blanking period is read out and displayed on the screen during the next horizontal display period.

As described above, in the VRAM mode, when video data is input from the video port interface (V_Port-IF) 163, the refresh rate is automatically changed in correspondence with the vertical sync frequency of that video data. In this manner, the number of field images of a motion picture to be refreshed per sec upon writing of video data into the VRAM 17 can be matched with the number of fields to be read out from the VRAM 17 and displayed per sec for refreshing the screen, thus preventing "tearing". Also, since the horizontal/vertical sync signals (video H-Sync and video V-Sync) of the video data are directly used as those (refresh H-Sync and V-Sync) for display on the display monitor or TV, mapping of video data onto the VRAM 17 and refreshing can be perfectly synchronized, and also a horizontal line can be prevented from appearing at a specific fixed position on the display screen.

Note that the refresh rate change processing in case of video display may be implemented by software control. In this case, an application program or display driver for reproducing DVD video data sets the vertical sync frequency of DVD video data to be reproduced in the control register of the PCI interface 161 as the refresh rate.

Figures 4, 7:
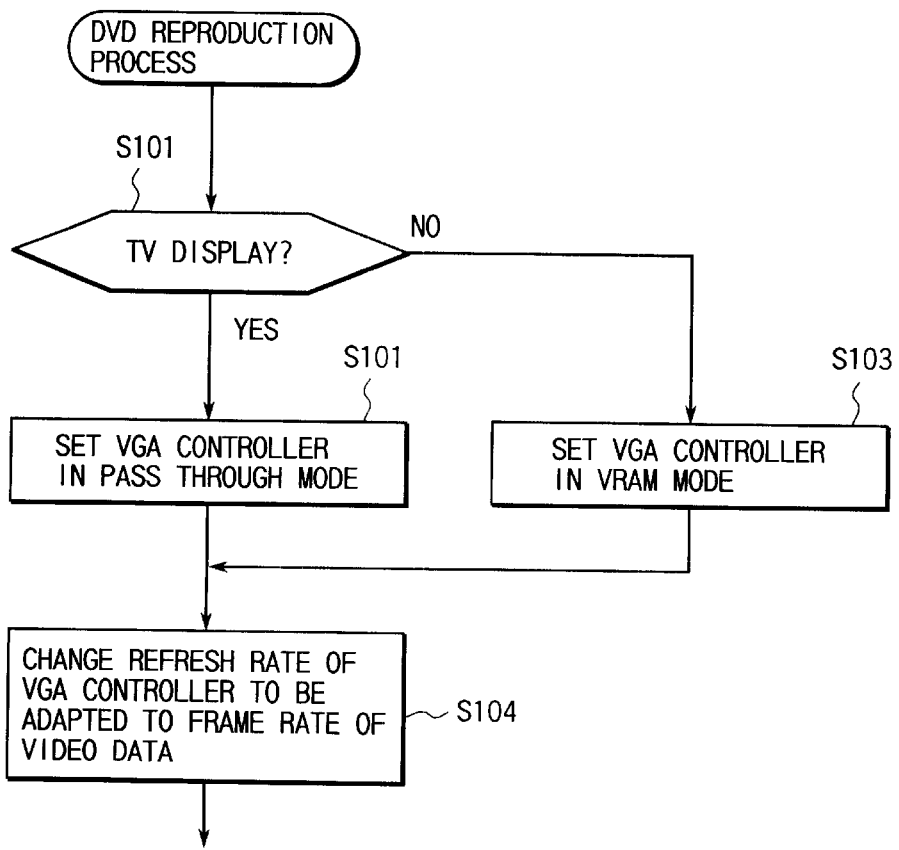
FIG. 4 is a table showing an example of the refresh rates in a graphics display and video display (including a synthesis display of video data and graphics data) applied to the computer system of the embodiment shown in FIG. 1.
FIG. 7 is a flow chart for explaining VGA control in a motion picture reproduction mode in the computer system of the embodiment shown in FIG. 1.

FIG. 4 shows an example of the refresh rates in a graphics display and video data display (including synthesis display of video and graphics data).

As shown in FIG. 4, in case of a graphics display, several different refresh rates are normally prepared in units of screen resolutions, and the refresh rate used is determined by the screen resolution of the display monitor or user's setups. By contrast, in case of a video display, the refresh rate is automatically selected to match the vertical sync frequency of the video data. Since the vertical sync frequency (60 Hz) of DVD video data is the value supported at every resolutions of the graphics display, a normal screen display can be attained even when a synthesis display of video and graphics data is made at a refresh rate of 60 Hz as the vertical sync frequency of DVD video data.

Figure 5:
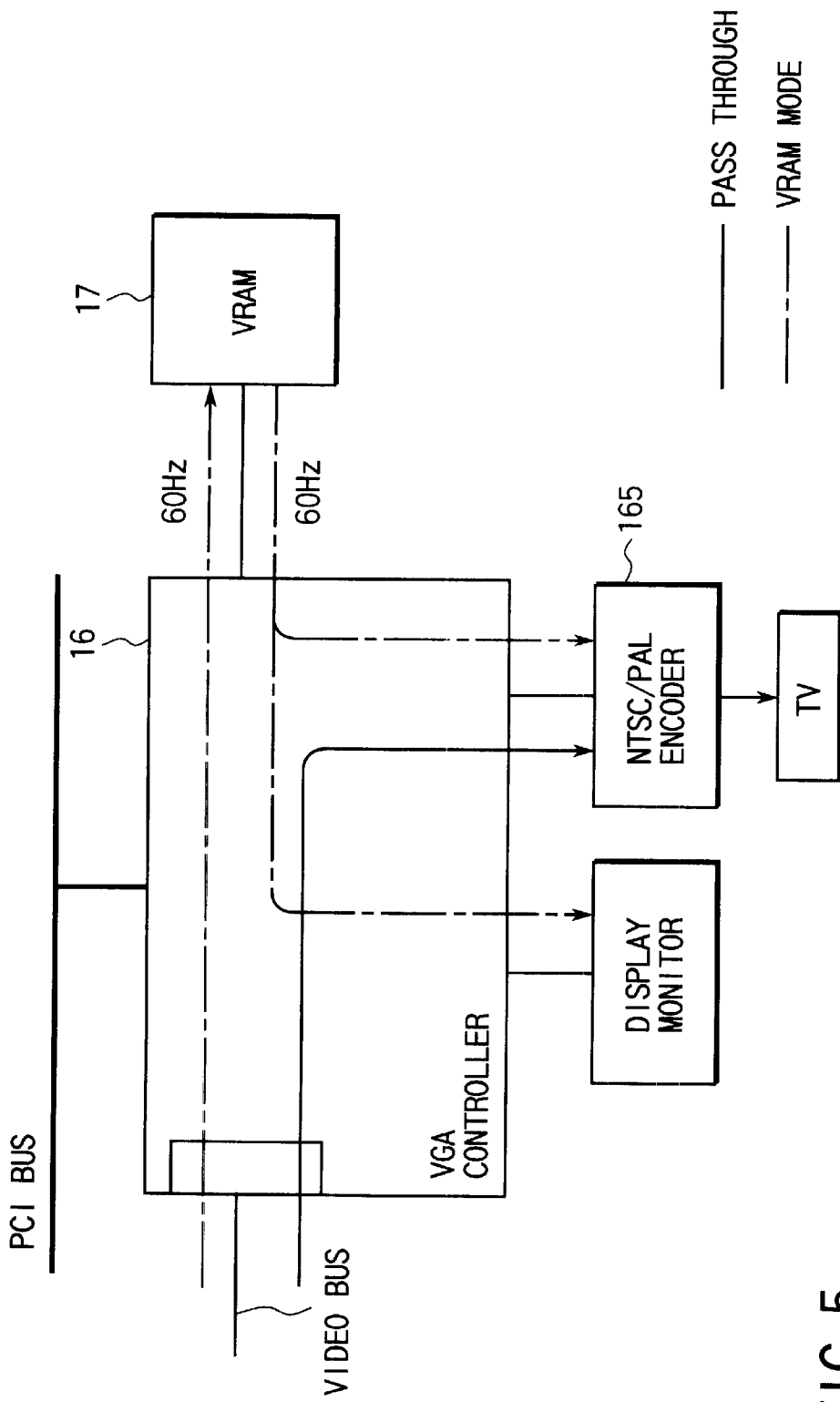
FIG. 5 is a diagram showing the flow of video data in a pass through mode and a VRAM mode in the computer system of the embodiment shown in FIG. 1.

FIG. 5 illustrates the flows of video data in the pass through mode and VRAM mode.

In the pass through mode, video data input to the video port of the VGA controller 16 via the video bus is directly input to the NTSC/PAL encoder 165 without being written in the VRAM 17, and is displayed on the screen of the TV. On the other hand, in the VRAM mode, video data input to the video port of the VGA controller 16 via the video bus undergoes conversion processes such as color-space conversion from YUV to RGB, conversion of the signal band (conversion of the dynamic range), conversion from the interlace mode to the non-interlace mode, and the like, and the processed data is written in the VRAM 17. After that, the video data is read out from the VRAM 17, and is displayed on the screen of the display monitor. In this case, mapping of video data onto the VRAM 17 and refreshing are done at an identical frequency. In both the pass through mode and VRAM mode, the horizontal/vertical sync signals of the video data input to the video port are directly used as those for display on the display monitor or TV.

Figure 6:
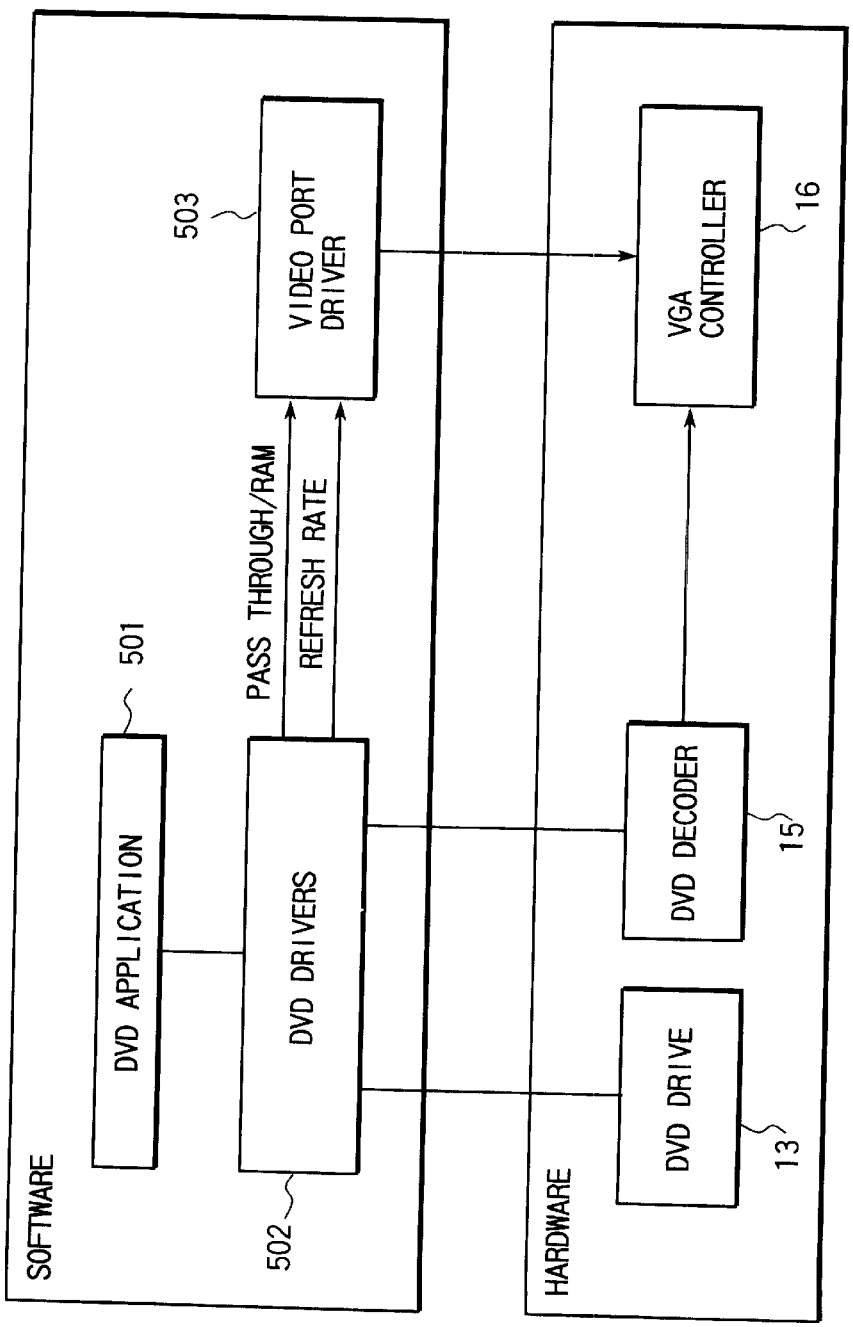
FIG. 6 is a block diagram showing the relationship between software and hardware in the computer system of the embodiment shown in FIG. 1.

FIG. 6 shows the correspondence between hardware and software used in this embodiment.

Reproduction of a DVD title on a DVD medium is controlled by a DVD application program 501, DVD drivers 502, and video port driver 503. The DVD application program 501 is a program for controlling reproduction of the DVD title. The program 501 displays a console window for controlling reproduction of the DVD title on the screen, and controls the operation of the DVD drive 13 and DVD decoder 15 using the DVD drivers 502. The video port driver 503 is a software driver for controlling the video port of the VGA controller 16.

The DVD application program 501 issues a command for selecting the motion picture display mode of the VGA controller 16 to the video port driver 503 directly or via the DVD drivers 502. In response to this command, the video port driver 503 updates the above-mentioned switch control information to switch the display mode between the pass through mode and VRAM mode. When the refresh rate upon display of video data is controlled by software, the DVD application program 501 issues a refresh rate change command to the video port driver 503 directly or via the DVD drivers 502 prior to motion picture reproduction.

The VGA control operation by the DVD application program 501 in DVD reproduction will be explained below with reference to the flow chart in FIG. 7.

The DVD application program 501 checks if DVD video data is to be displayed on the TV or display monitor (step S101). This checking process can be attained by, e.g., checking if the display device designated by the user is a TV or by detecting if the computer of this embodiment is physically connected to a TV, and determining that the TV is the target display device if it is connected to the TV. If DVD video data is to be displayed on the TV, the video display mode set in the control register 161a in the VGA controller 16 is set in the pass through mode (step S102); if DVD video data is to be displayed on the display monitor, the video display mode set in the control register 161a in the VGA controller 16 is set in the VRAM mode (step S103).

After such setups, the DVD application program 501 changes the refresh rate of the VGA controller 16 in correspondence with the vertical sync frequency (frame rate) of the DVD video data (step S104). Upon completion of the above setups, DVD video reproduction starts.

As described above, according to this embodiment, the refresh rate of the VGA controller 16 is changed in correspondence with the vertical sync frequency of DVD video data, the horizontal/vertical sync signals of the input video data are allowed to be used as those for display on the display monitor or TV, or the pass through mode for directly inputting video data from the video port interface (V_PortIF) 163 to the NTSC/PAL encoder 165 is used, thus displaying motion picture data on the TV or display monitor with high quality.

In this embodiment, a display of DVD video data has been exemplified. However, the same reproduction control method can also be applied to motion picture data consisting of an MPEG2 stream received by the satellite tuner 14.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display controller for displaying an image, comprising:
    a first port which inputs video data;
    a second port which inputs graphics data;
    a refresh manager configured to set a vertical sync frequency of the video data as a refresh rate used for displaying the video data input from the first port and the graphics data input from the second port; and
    a controller configured to operate in one of a first display mode in which the video data inputted from the first port is written into an image memory at a vertical sync frequency of the video data, and a second display mode in which the video data input from the first port is directly transferred from the first port to an encoder without being written in the image memory.

2. The controller according to claim 1, wherein horizontal/vertical sync signals of the video data input from said first port are used as horizontal/vertical sync signals for displaying the video data and the graphic data.

3. The controller according to claim 1, further comprising:
    a memory controller configured to write the video data input from said first port into the image memory at the vertical sync frequency of the video data, wherein
        the encoder is configured to encode video data read from the image memory to produce encoded video data to be displayed at the refresh rate.

4. A controller according to claim 1, wherein the display monitor is a flat panel display monitor and the second display monitor is a TV monitor.

5. A display controller for displaying video data written in an image memory of a computer, comprising:
    a first port which inputs video data;
    a second port which inputs graphics data;
    an encoder configured to encode the video data read from the image memory;
    a transfer bus connected between said first port and the encoder; and a controller configured to operate in one of a first display mode in which the video data inputted from the first port is written into the image memory at a vertical sync frequency of the video data, and a second display mode in which the video data input from the first port is directly transferred from the first port to the encoder without being written in the image memory.

6. The controller according to claim 5, further comprising a switch, arranged at an input stage of the encoder, configured to selectively input one of the video data transferred via said transfer bus and display data read out from the image memory to the encoder.

7. A controller according to claim 6, further comprising a register which is accessible by a CPU of the computer, and stores switch control information for controlling said switch means, and wherein data to be input to the TV encoder is switched based on the switch control information.

8. A controller according to claim 5, wherein the display monitor is a flat panel display monitor and the second display monitor is a TV monitor.

9. A computer system for displaying image data, comprising:

a decoder configured to decode coded data to produce video data;

a first display monitor configured to display the image data;

a memory configured to store the video data and graphics data; and a display controller, which outputs the image data read from the memory to at least one of the display monitor and a second display monitor capable of being connected to the computer, has a first port to which the video data output from the decoder is input at a first clock, a second port to which the graphics data read from the memory is input at a second clock, and has an encoder configured to encode the video data read from the memory and to display the encoded data on the second display monitor, the display controller being operated in one of a first display mode in which the video data inputted from the first port is written into the memory at a vertical sync frequency of the video data, and a second display mode in which the video data input from the first port is directly transferred from the first port to the encoder without being written in the memory.

10. The system according to claim 9, wherein the coded data comprises digitally compressed and encoded motion picture data.

11. The system according to claim 9, wherein the first display monitor comprises a flat panel display monitor and the second display monitor comprises a TV monitor.

12. The system according to claim 9, further comprising a switch, arranged at an input stage of the encoder, configured to selectively input to the encoder one of motion picture data transferred via a transfer bus, and display data read out from the memory, and wherein graphics data read out as the display data from the memory, and the motion picture data are synthesized and displayed using the switch.

13. The computer system according to claim 9, wherein said first display monitor comprises a non-interlaced type monitor and said second display monitor comprises an interlaced type monitor.

14. The computer system according to claim 9, wherein said first display monitor comprises a graphic display monitor of a non-interlaced type and said second display monitor comprises a video display monitor of an interlaced type.

15. The computer system according to claim 9, further comprising:

a multiplexer configured to multiplex the video data and graphics data read out from the memory and to supply the multiplexed data to at least one of the first display monitor and the second display monitor.

16. The computer system according to claim 9, wherein the video data inputted from the first port is supplied to the first display monitor in the first mode and the video data input from the first port is supplied to the second display monitor in the second mode.

17. A display control method for displaying an image on a display monitor, comprising:

inputting video data to a first port at a first clock;

inputting graphics data at a second clock; and selecting one of a first display mode in which the inputted video data is written into a memory at the first clock and the graphics data is written into the memory at the second clock and the video data and the graphics data are output from the memory at the first clock to be supplied to the display monitor and a second display mode in which the video data is directly transferred, from the first port to an encoder that supplies encoded data to a display monitor, via a transfer bus connected to the first port at the first clock, without being written in the memory.

18. A display controller connectable to a display monitor, comprising:

a video port interface connected to a video bus which transfers video data;

a system bus interface connected to a system bus of a computer which transfers graphics data;

a memory configured to store the video data input from the video port interface and the graphics data input from the system bus interface, the video data and the graphics data being written into the memory during a blanking period of a vertical sync frequency of the video data;

a refresh manager configured to match a refresh rate used for displaying the video data and the graphics data on the display monitor with the vertical sync frequency of the video data;

a controller configured to selectively transfer video data directly from the video port interface to an encoder that supplies encoded data to a video display monitor, the directly transferred data bypassing the refresh manager and the memory; and a display circuit configured to read and supply the video data and the graphics data from the memory based on the vertical sync frequency of the video data to the display monitor, wherein the display circuit is operated in one of a first display mode in which the video data inputted from the video port interface is written into the memory at a vertical sync frequency of the video data, and a second display mode in which the video data input from the video port interface is directly transferred from the video port interface to the encoder without being written in the memory.

* * * * *